(12) United States Patent
Tai (10) Patent No.: US 8,297,312 B2
(45) Date of Patent: Oct. 30, 2012

(54) PORTABLE ONE-TO-MANY CONTROL DEVICE FOR A SPRINKLER PIPELINE

(76) Inventor: Su-Hua Tai, Kweishan Hsiang (TW)

( * ) Notice: Subject to any disclaimer, the term of this patent is extended or adjusted under 35 U.S.C. 154(b) by 356 days.

(21) Appl. No.: 12/591,382

(22) Filed: Nov. 18, 2009

(65) Prior Publication Data

US 2011/0118881 A1     May 19, 2011

(51) Int. Cl.
*F16K 31/02* (2006.01)
*G05D 7/00* (2006.01)

(52) U.S. Cl. ......... 137/624.16; 137/624.12; 251/129.15; 251/129.04; 239/69

(58) Field of Classification Search ............ 137/624.12, 137/624.16, 624.11; 251/129.04, 129.15; 239/69
See application file for complete search history.

(56) References Cited

U.S. PATENT DOCUMENTS

| 5,293,554 A * | 3/1994 | Nicholson | 239/70 |
| 6,337,635 B1 * | 1/2002 | Ericksen et al. | 137/624.12 |
| 7,216,659 B2 * | 5/2007 | Caamano et al. | 251/129.04 |

* cited by examiner

*Primary Examiner* — Kevin Lee
(74) *Attorney, Agent, or Firm* — Rosenberg, Klein & Lee (57) ABSTRACT

A portable one-to-many control device for a sprinkler pipeline including a plurality of control valves at the sprinkler pipeline. The control valve has a main body; a memory and drive unit positioned within the mounting body; and a portable control instrument movably and electrically connected to the memory and drive unit of the different control valve. According to the data saved in the microprocessor and the different requirements of the control valves, the preset instructions can be saved in the memory and drive unit for controlling the activation time of the electromagnetic solenoids, respectively. In this way, many control valves can be set and controlled by only one portable control instrument. Accordingly, the cost can be saved and it is not necessary to be placed outside for the protection from damage. Meanwhile, it is easy to connect to the personal computer for a mutual data transmission, thereby achieving a more convenient and accurate control of the sprinkling process.

11 Claims, 10 Drawing Sheets

PORTABLE ONE-TO-MANY CONTROL DEVICE FOR A SPRINKLER PIPELINE

BACKGROUND OF THE INVENTION

1. Field of the Invention

The invention relates to a sprinkling control valve, and more particularly to a portable control instrument capable of one-to-many control.

2. Description of the Related Art

Figure 1:
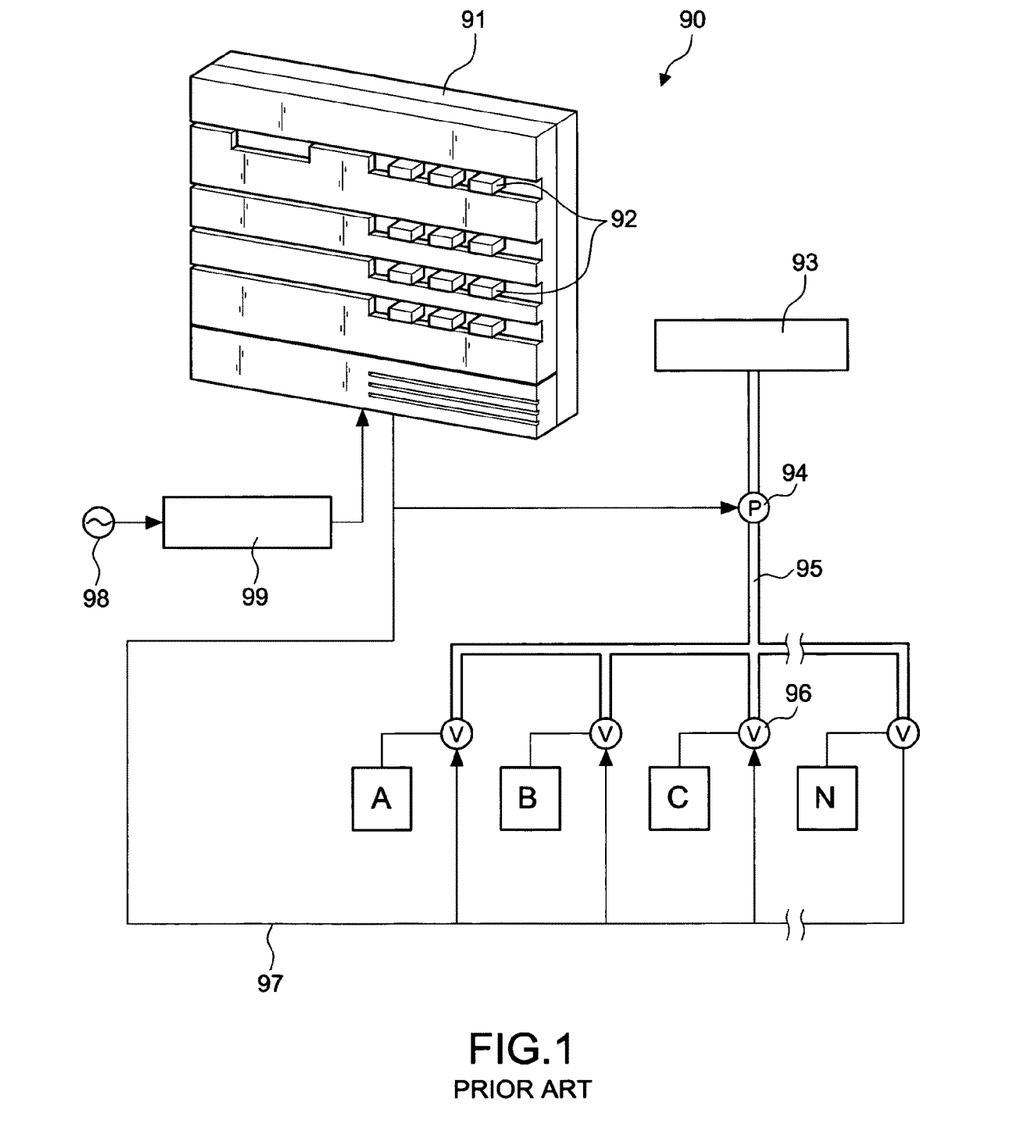
FIG. 1 is a schematic drawing of a system type sprinkler control device of the prior art.

As shown in FIG. 1, a conventional sprinkler system 90 for watering a lawn at a large area (such as parks, house gardens, golf courses, etc.) includes a controlling machine 91 with a plurality of control knobs 92. Moreover, a plurality of aqueducts 95 are placed under the ground at the area to be watered. A control valve 96 is provided at each of the sprinkled areas A, B, C, ..., N. When the water is delivered by a pump 94 of a water supply unit 93 to the aqueducts 95, the duration of the on/off state of the control valves 96 is controlled by the controlling machine 91 via a cable 97. In this way, a desired effect to apply water to the sprinkling areas A, B, C, ..., N is achieved.

However, the above-mentioned sprinkler system 90 requires professionals for installing the aqueducts 95 in advance. The work is huge and it is difficult for the installation work. Moreover, the controlling machine 91 has to be installed indoors. Moreover, the AC current passing through a transformer 99 is supplied to the controlling machine 91. Such a structure is disclosed in U.S. Pat. No. 5,293,554.

Figure 2:
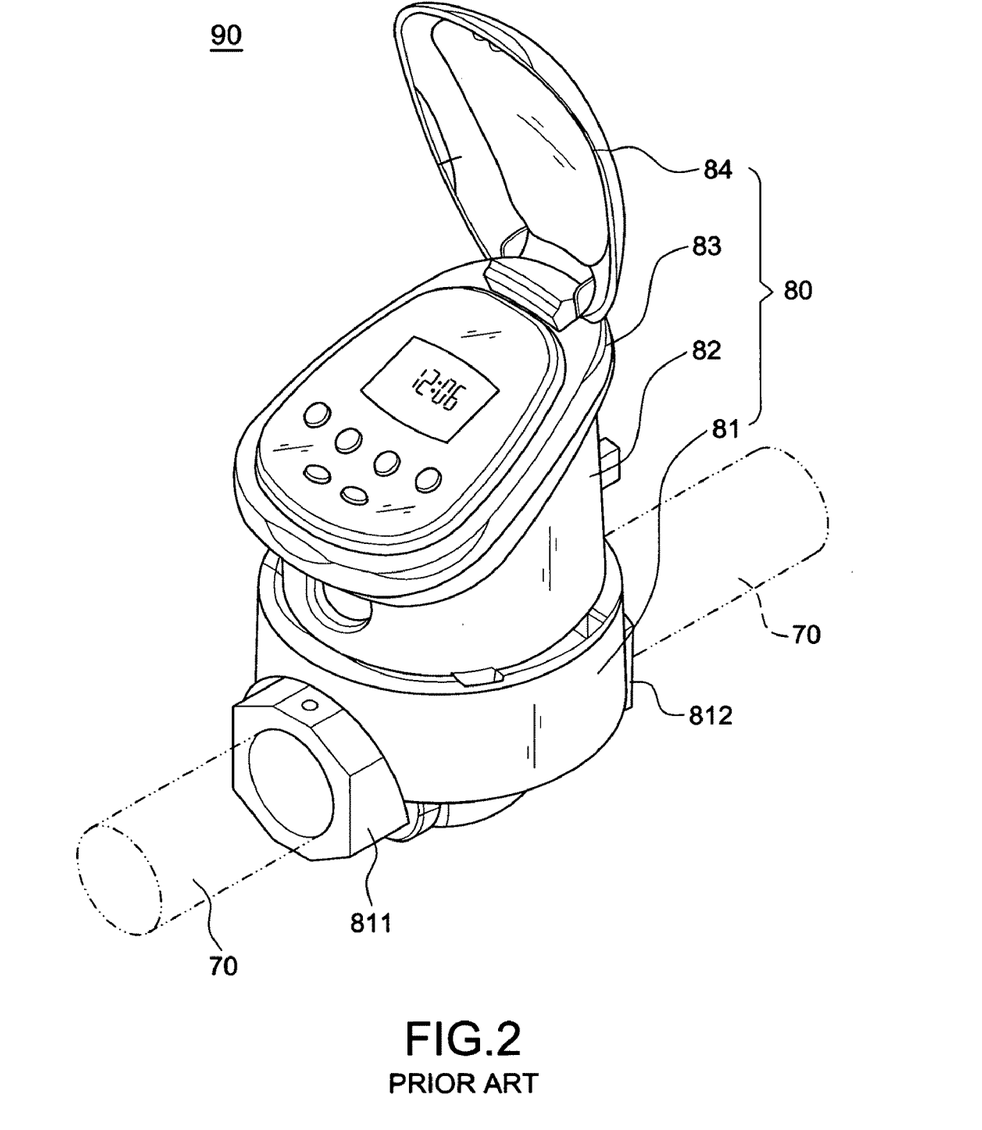
FIG. 2 is a perspective view of a conventional sprinkling control valve.
Figure 3:
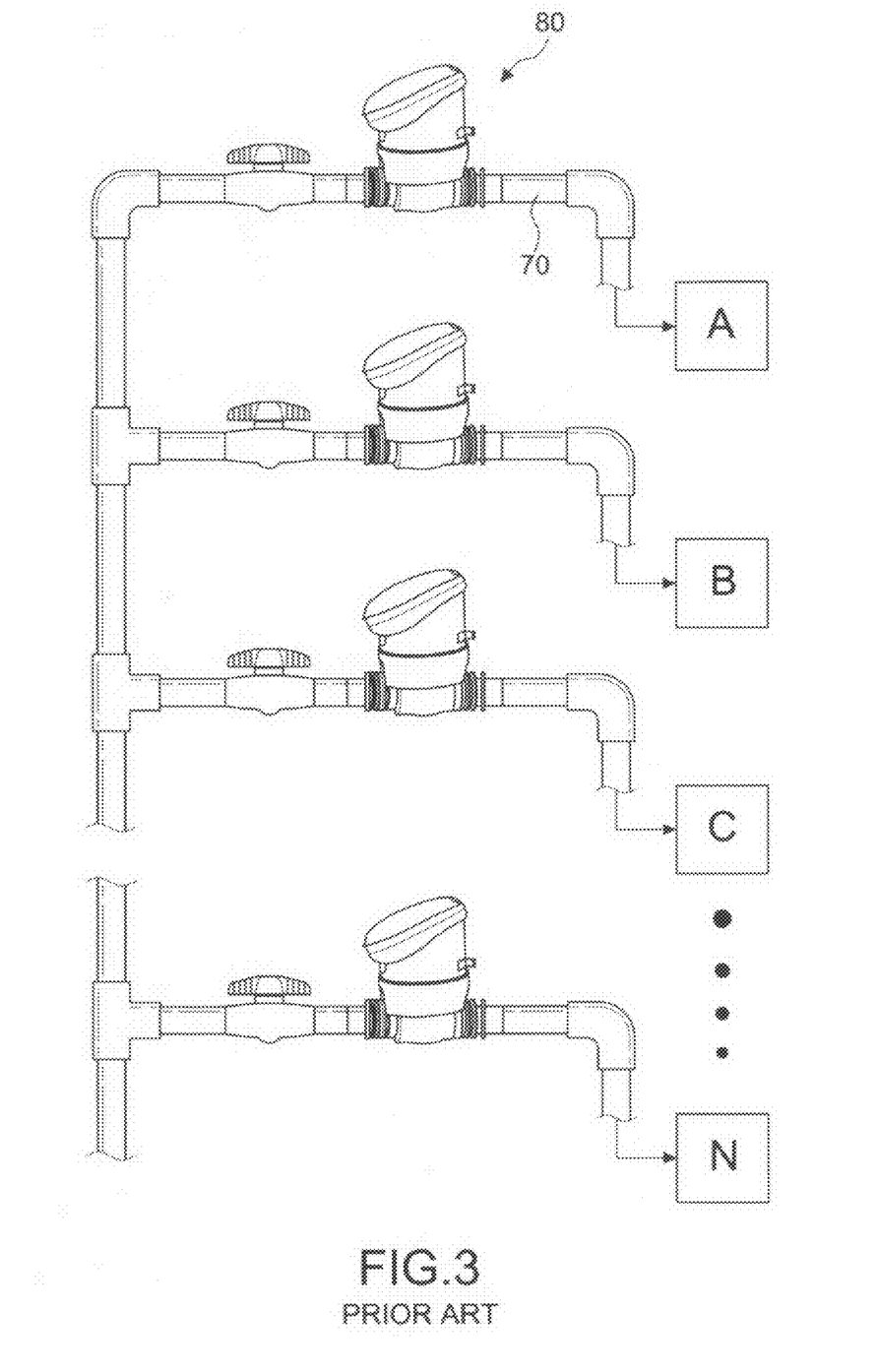
FIG. 3 is an application view of the conventional sprinkling control valve.

As shown in FIGS. 2 and 3, another sprinkling control system does not require a pre-installation of aqueducts 95. The sprinkling pipes 70 lie directly on the ground. A sprinkling control valve 80 is fitted to the pipe for each of different sprinkling areas A, B, C, ..., N. The sprinkling control valve 80 includes a main body 81 with a water inlet 811 at the front end thereof as well as a water outlet 812 at the rear end thereof. The main body 81 includes a valve (not shown) for controlling the on/off state thereof and a housing 82 at the top thereof. A control panel 83 and a cover 84 are mounted on the top of the housing 82. The control panel 83 is adapted to control the activation time of the sprinkling control valves 80 according to the desired sprinkling duration for each of the areas A, B, C, ..., N.

Regarding the above-mentioned control systems, the latter is superior to the former due to the convenient installation. However, each of the sprinkling pipes 70 has to be fitted with a sprinkling control valve 80 having the control panel 83. The inside of the control panel 83 has control unit such as microprocessor which takes up the substantial part of cost of the sprinkling control valve 80. In other words, if there are a hundred of sprinkling control valves 80, a hundred of control panels 83 must be used as well. Moreover, each of the control panel 83 requires the electric power for a smooth operation. Thus, a big battery or many small batteries (not shown) have to be installed within the housing 82 for supplying the electric power to the control panel 83. When the electric power is used up, the batteries have to be replaced. The replacement of the batteries requires the detachment of the control panel 83, thereby putting the operator to great inconvenience.

In addition, the most substantial problem is that, when there are a hundred of sprinkling control valves 80, the operator has to set the sprinkling time at each of the control panels 83 of the 100 sprinkling control valves 80. Furthermore, the control panel 83 is small so that it is difficult and inconvenient for its operation. Besides, it is not possible to integrate the data of the sprinkling control valves 80 for an effective data management. As a result, a more scientific control management is not achieved. This requires further improvement.

SUMMARY OF THE INVENTION

An object of the invention is to provide a portable one-to-many control device for a sprinkler pipeline wherein several sprinkling control valves may be controlled by only one control instrument such that they are activated at a preset time. Accordingly, a convenient installation, a practical adjustment, and a cost- and energy-saving effect is achieved.

Another object of the invention is to provide a portable one-to-many control device for a sprinkler pipeline wherein the control instrument is portable. Therefore, it is not necessary to secure the control instrument to the sprinkling control valves. In this way, the control instrument is not easy to be damaged, thereby increasing the service life of the product. Meanwhile, a reliable operation of the product is ensured.

A further object of the invention is to provide a portable one-to-many control device for a sprinkler pipeline wherein the control instrument can be connected to the personal computer. The operation and the setting process may be completed by the computer. Thereafter, a mutual data transmission may take place. Accordingly, a convenient use is achieved. Furthermore, all of the sprinkling data may be easily controlled, thereby fulfilling the requirements of accurate control and scientific management.

In order to achieve the above-mentioned objects, the invention includes:

a) a plurality of sprinkling pipes with a control valve fitted to each of the sprinkling pipes for controlling the on/off state of the sprinkling water; and b) an electromagnetic solenoid positioned on the control valve, the electromagnetic solenoid having a shaft stopper for opening or closing the bypass passage, thereby raising or lowering a valve body within the control valve as well as enabling the sprinkling waterflow in a passing-through state or in a blocked state, wherein a mounting body sits on the top of the control valve, and the mounting body is shaped higher than the electromagnetic solenoid;

wherein a memory and drive unit is positioned within the mounting body and powered by a battery, and a first transmission interface is provided at the front end of the first transmission interface while the rear end thereof is in electric connection to the electromagnetic solenoid, and the memory and drive unit is employed for saving data and for activating the electromagnetic solenoid at a preset time (according to the saved data) to raise/lower the shaft stopper;

wherein the portable control instrument includes a housing corresponding to the mounting body, a display screen positioned on the surface of the housing, an operation interface, and a connection port, and wherein a second transmission interface is disposed at the bottom of the housing, and when the portable control instrument approaches to the mounting body, the second transmission interface can be electrically connected to the first transmission interface of the memory and drive unit, and wherein a microprocessor is positioned within the housing and electrically connected to the operation interface, the connection port, and the second transmission interface, and wherein the housing internally includes a DC power source for supplying the electric power to the display screen and the microprocessor, whereby the portable control instrument can be movably and electrically connected to the memory and drive unit of the different control valves; according to the data in the microprocessor and the different requirements of the control valves, the preset instructions can be transmitted and saved in the memory and drive unit for controlling the activation time of the electromagnetic solenoids, respectively; accordingly, many control valves can be set and controlled by only one portable control instrument.

BRIEF DESCRIPTION OF THE DRAWINGS

The accomplishment of this and other objects of the invention will become apparent from the following descriptions and its accompanying figures of which.

DETAILED DESCRIPTION OF THE PREFERRED EMBODIMENT

First of all, referring to FIGS. 4 through 9, a sprinkler system in accordance with a preferred embodiment of the invention includes a plurality of sprinkling pipes 70, and an electromagnetic solenoid 20.

A control valve 10 is fitted to each of the sprinkling pipes 70 for controlling the on/off state of the sprinkling water. According to this embodiment, the control valve 10 includes (but should not be limited thereto) a main body 11, a hood body 19, and a valve-lifting unit 18

The main body 11 includes a water inlet 12 at the front end thereof and a water outlet 13 at the rear end thereof. The main body 11 is attached to the sprinkling pipeline. A first chamber 14 and a second chamber 15 are interposed between the water inlet 12 and the water outlet 13. A through hole 141 is formed above the first chamber 14 of the main body 11.

The hood body 19 is positioned at the top of the main body 11, and a diaphragm 17 sits in the through hole 141 such that a third chamber 16 is created in the hollow room of the hood body 19. A bypass passage 22 is disposed at the side of the third chamber 16 and under the electromagnetic solenoid 20. Moreover, the water outlet 221 of the bypass passage 22 leads to the second chamber 15.

The valve-lifting unit 18 includes a cross plate 181 at the central part thereof. The cross plate 181 is secured to the diaphragm 17. An upright hollow tube 182 is extended through the center thereof. A valve body 183 is attached to the bottom of the cross plate 181 and positioned at the top of the first chamber 14 for controlling the first and second chambers 14 in a separation or communication state. A spring 184 fits over the upright hollow tube 182 above the cross plate 181. The bottom of the upright hollow tube 182 includes an inflow hole 185 within the first chamber 14 while the top of the upright hollow tube 182 has an outflow hole 186 within the third chamber 16.

The electromagnetic solenoid 20 is positioned on the control valve 10. The electromagnetic solenoid 20 includes a shaft stopper 21 for the bypass passage 22. The bypass passage 22 can be opened or closed when the shaft stopper 21 moves in a retracted or extended position. In this way, the valve body 183 within the control valve 10 is raised or lowered such that the first and second chambers 14, 15 are separated from each other (see FIG. 6) or communicate with each other (see FIG. 7). In other words, when the shaft stopper 21 is extended to close the bypass passage 22, the sprinkling water flows from the water inlet 12 through the first chamber 14 and enters through the inflow hole 185 into the upright hollow tube 182. Thereafter, it flows out of the outflow hole 186 and enters into the third chamber 16. At that time, the bypass passage 22 is blocked by the shaft stopper 21, and the water within the third chamber 16 can't be drained, thereby applying a pressure to the cross plate 181. As a result, the valve body 183 is pushed against the top of the first chamber 14. In this way, the sprinkling water is not able to flow to the second chamber 15 and the water outlet 13, thereby creating a closed state.

Figure 7:
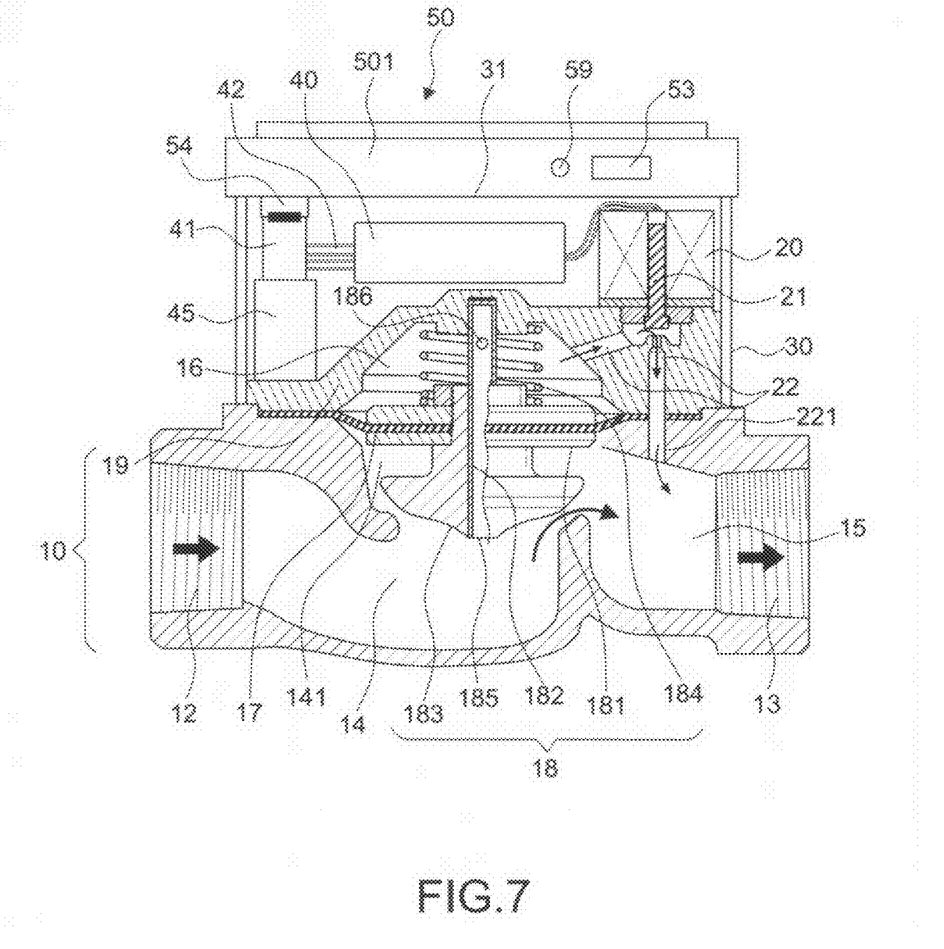
FIG. 7 is a cutaway view of a control device in accordance with the invention in an opened state.

To the contrary, as shown in FIG. 7, when the shaft stopper 21 is retracted to open the bypass passage 22, the pressure created by the water flowing into the first chamber 14 acts on valve-lifting unit 18 such that the valve body 183 is raised to open the passage between the first and second chambers 14, 15. In this way, an open state is created for supplying water.

The above-mentioned principle and structure belongs to the prior art so that no further descriptions thereto are given hereinafter.

Referring to the drawing, the features of the invention will be detailed hereinafter.

A mounting body 30 sits on the top of the main body 11 of the control valve 10. The mounting body 30 may be formed individually and then secured to the control valve 10. Alternatively, the mounting body 30 may be integrally formed with the hood body 19. Besides, the mounting body 30 has an opening 31 in a circular, square, oval, etc. shape. The mounting body 30 is shaped higher than the electromagnetic solenoid 20 for enclosing it.

A memory and drive unit 40 is positioned within the mounting body 30 and powered by a battery 44. In this embodiment, the memory and drive unit 40 is installed at the side of the electromagnetic solenoid 20 with a first transmission interface 41 positioned at the front end thereof. The first transmission interface 41 is constructed as a male connector or a female connector in which a plurality of signal and power transmission lines 42 are combined. The first transmission interface 41 is secured to a positioning body 45 with a cable 43 in electric connection to the electromagnetic solenoid 20. The memory and drive unit 40 is a control unit for saving data and for activating the electromagnetic solenoid 20 at a preset time (according to the saved data) to raise/lower the shaft stopper 21. According to the memory and drive unit 40 in this embodiment, the circuit and the components have been packaged to be a small box. The memory element and the driving circuit are obvious for one skilled in the art so that no further descriptions thereto are given hereinafter.

Figure 4A:
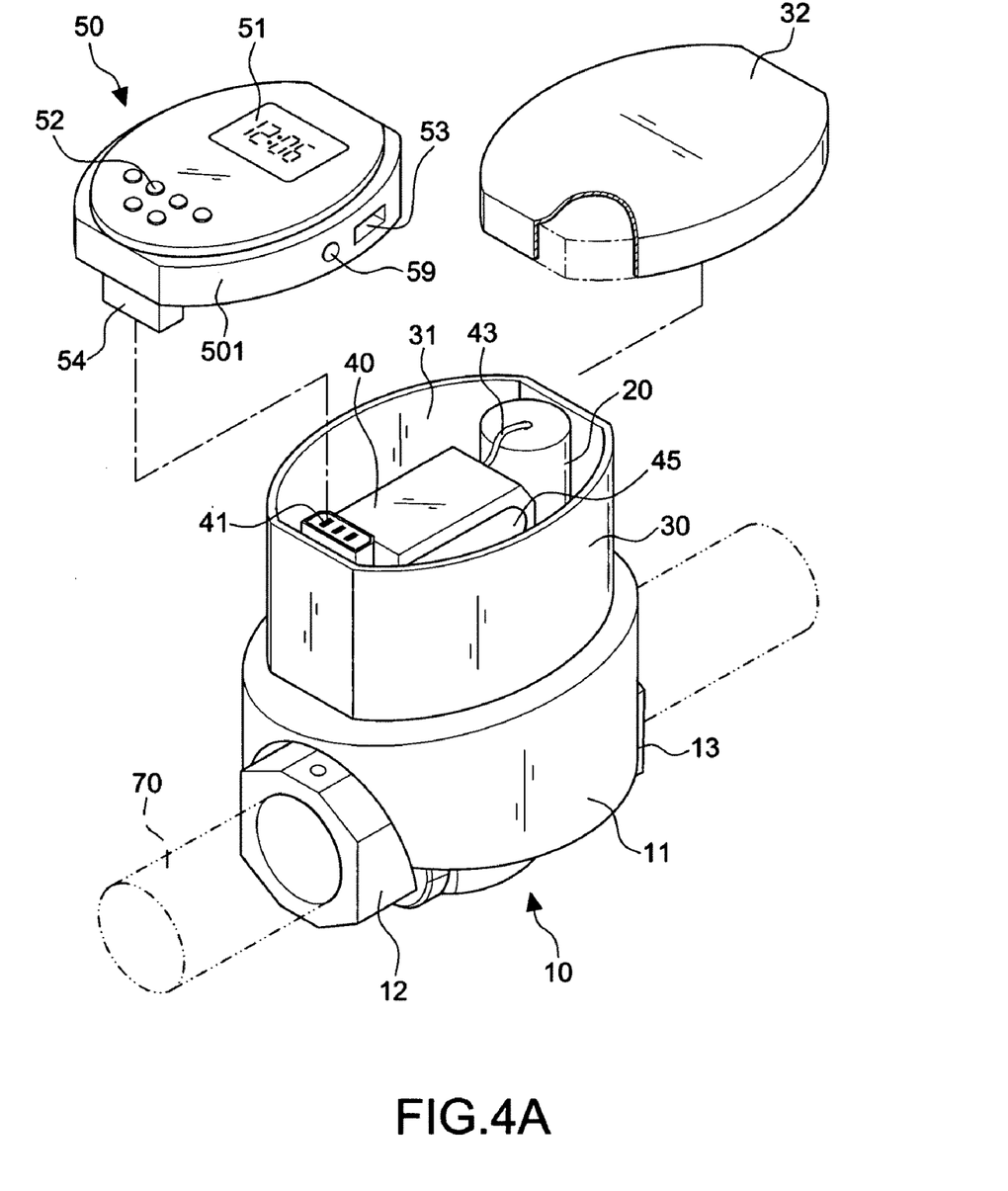
FIGS. 4A and 4B are exploded perspective views of a control device in accordance with the invention.
Figure 4B:
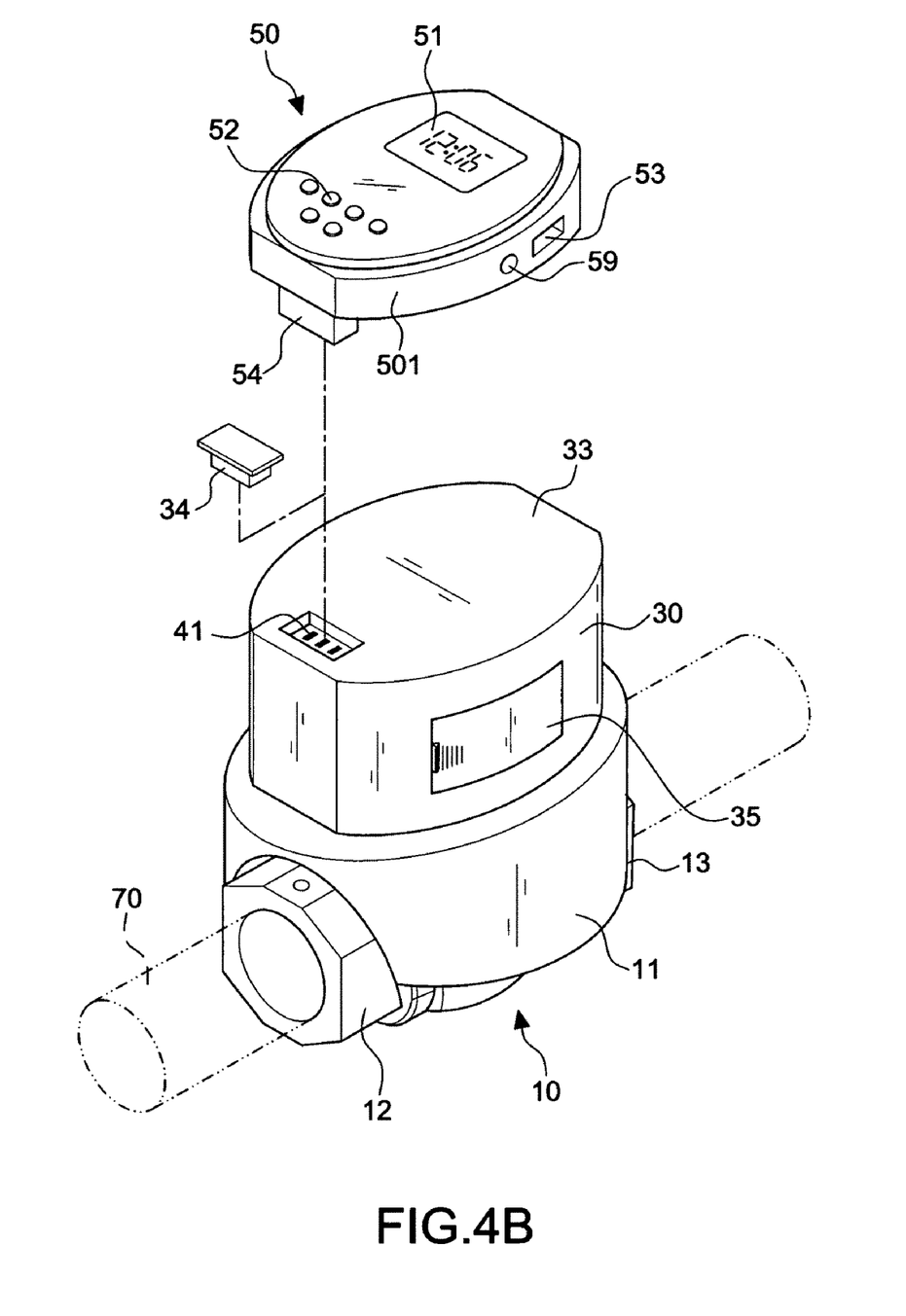
Figure 5:
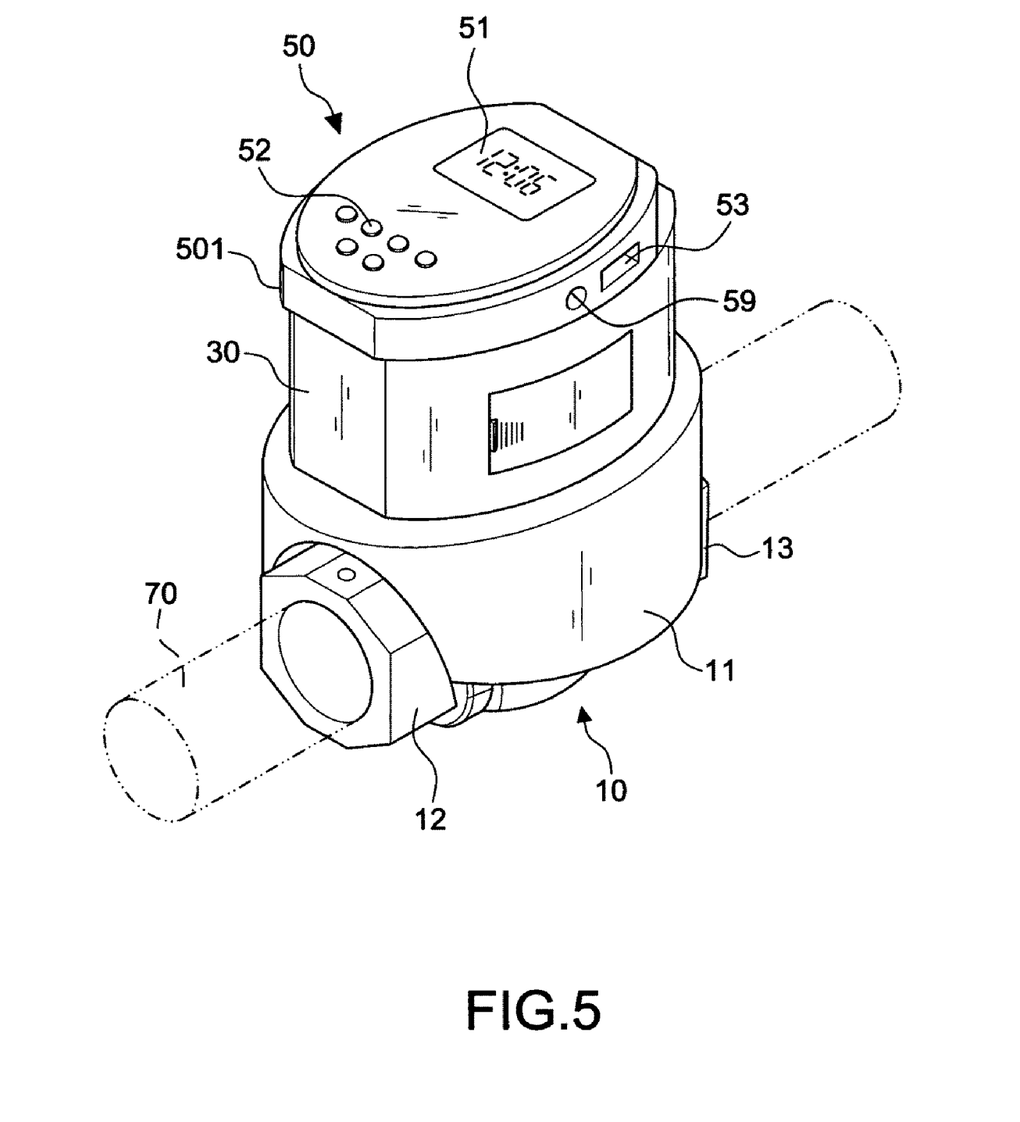
FIG. 5 is a perspective assembly view of a control device in accordance with the invention.

As shown in FIG. 4A, the mounting body 30 includes an opening 31. The opening 31 is covered with a detachable protection cover 32 to prevent the rain from entering into the mounting body 30 when not in use. In use, the protection cover 32 may be opened. Moreover, as shown in FIG. 4B, a covering face 33 is integrally formed with the mounting body 30 such that the opening 31 is constantly closed or covered except the first transmission interface 41. The first transmission interface 41 may be additionally covered by a small cover 331. In use, the small cover 331 may be detached for use. According to this structure, the mounting body 30 may include a battery cover 35 at the side thereof for an easy replacement of batteries therein.

Figure 6:
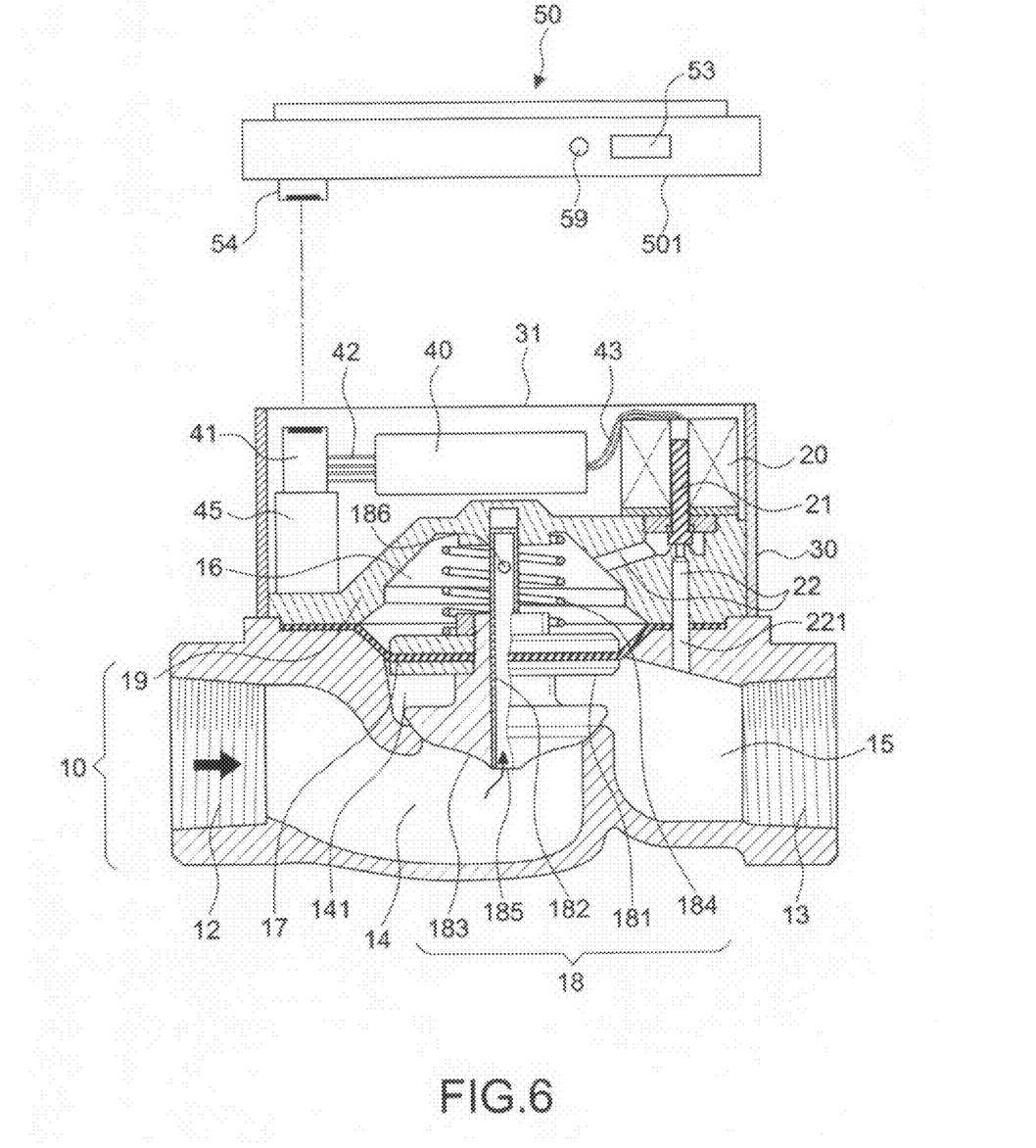
FIG. 6 is a cutaway view of a control device in accordance with the invention in a closed state.
Figure 8:
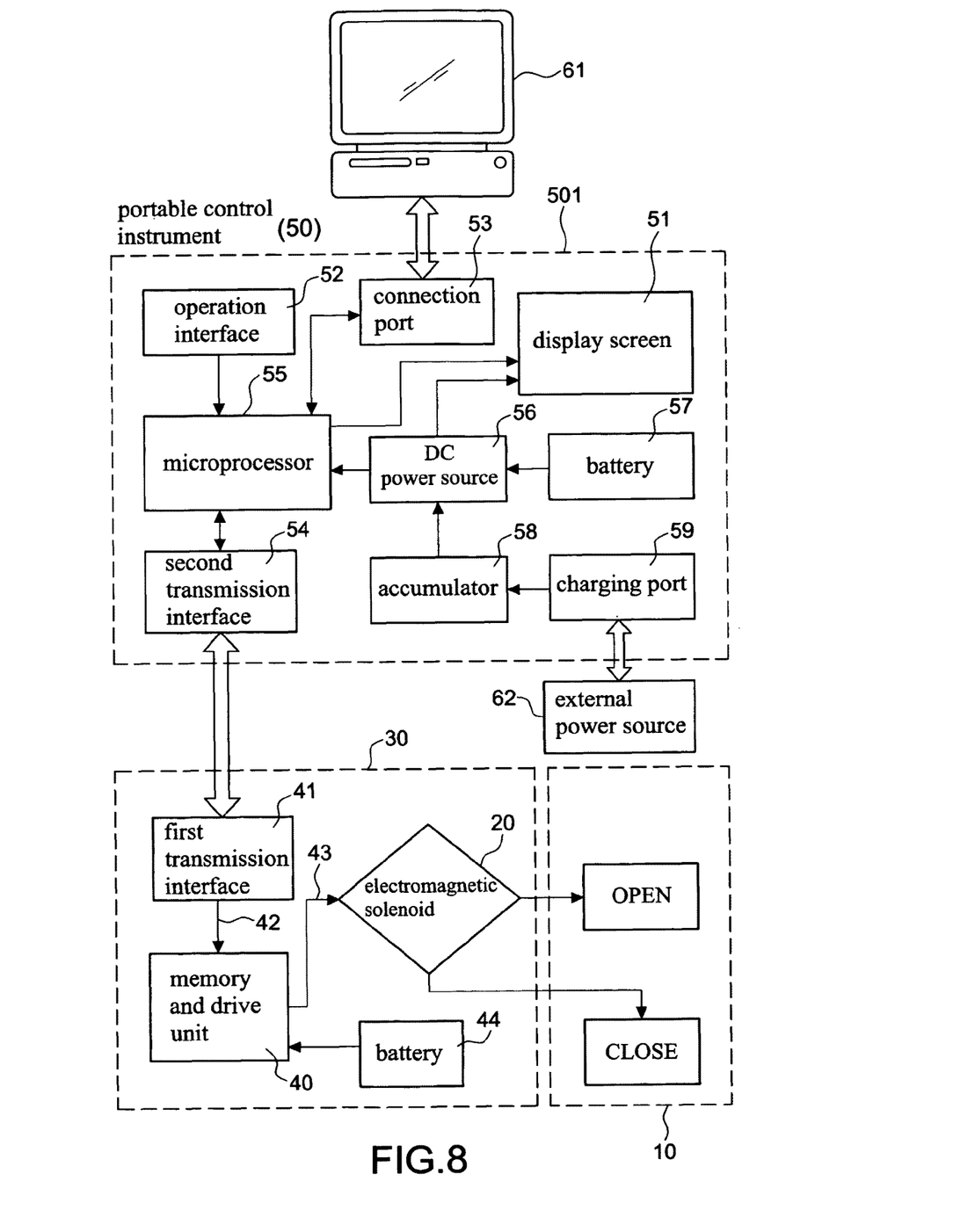
FIG. 8 is a block diagram of the control device in accordance with the invention.

Referring to FIGS. 6 through 8, the control device in accordance with the invention further includes a portable control instrument 50. The portable control instrument 50 includes a housing 501 corresponding to the mounting body 30, a display screen 51 positioned on the surface of the housing 501, an operation interface 52, and a connection port 53. A second transmission interface 54 is disposed at the bottom of the housing 501. When the portable control instrument 50 approaches to the opening 31, the second transmission interface 54 can be electrically connected to the first transmission interface 41 of the memory and drive unit 40. Moreover, a microprocessor 55 is positioned within the housing 501 and electrically connected to the operation interface 52, the connection port 53, and the second transmission interface 54. Moreover, the housing 501 internally includes a DC power source 56 for supplying the electric power to the display screen 51 and the microprocessor 55. According to this embodiment, the first and second transmission interfaces 41, 54 conduct a contact type transmission or a wireless transmission. For example, the first and second transmission interfaces 41, 54 can be constructed as a connector or a plug for the contact type transmission. Alternatively, they can be constructed as a wireless transmitter/receiver for the wireless transmission. The wireless transmission done through infrared, bluetooth, and light is well-known so that no further descriptions thereto are given hereinafter.

Based on the above-mentioned structure, the portable control instrument 50 can be movably and electrically connected to the memory and drive unit 40 of the different control valve 10. Besides, according to the data saved in the microprocessor 55 and the different requirements of the control valves 10, the preset instructions can be saved in the memory and drive unit 40 for controlling the activation time of the electromagnetic solenoids 20, respectively. In this way, many control valves 10 can be set and controlled by only one portable control instrument 50.

Referring to FIG. 8, the connection port 53 of the portable control instrument 50 is electrically connected to a computer 61 for a mutual data transmission.

Besides, the DC power source 56 of the portable control instrument 50 includes a battery 57 positioned within the housing 501.

In addition, the DC power source of the portable control instrument 50 includes an accumulator 58 within the housing 501. The accumulator 58 has a charging port 59 which is electrically connectable to an external power source 62 for executing the charging process.

Figure 9:
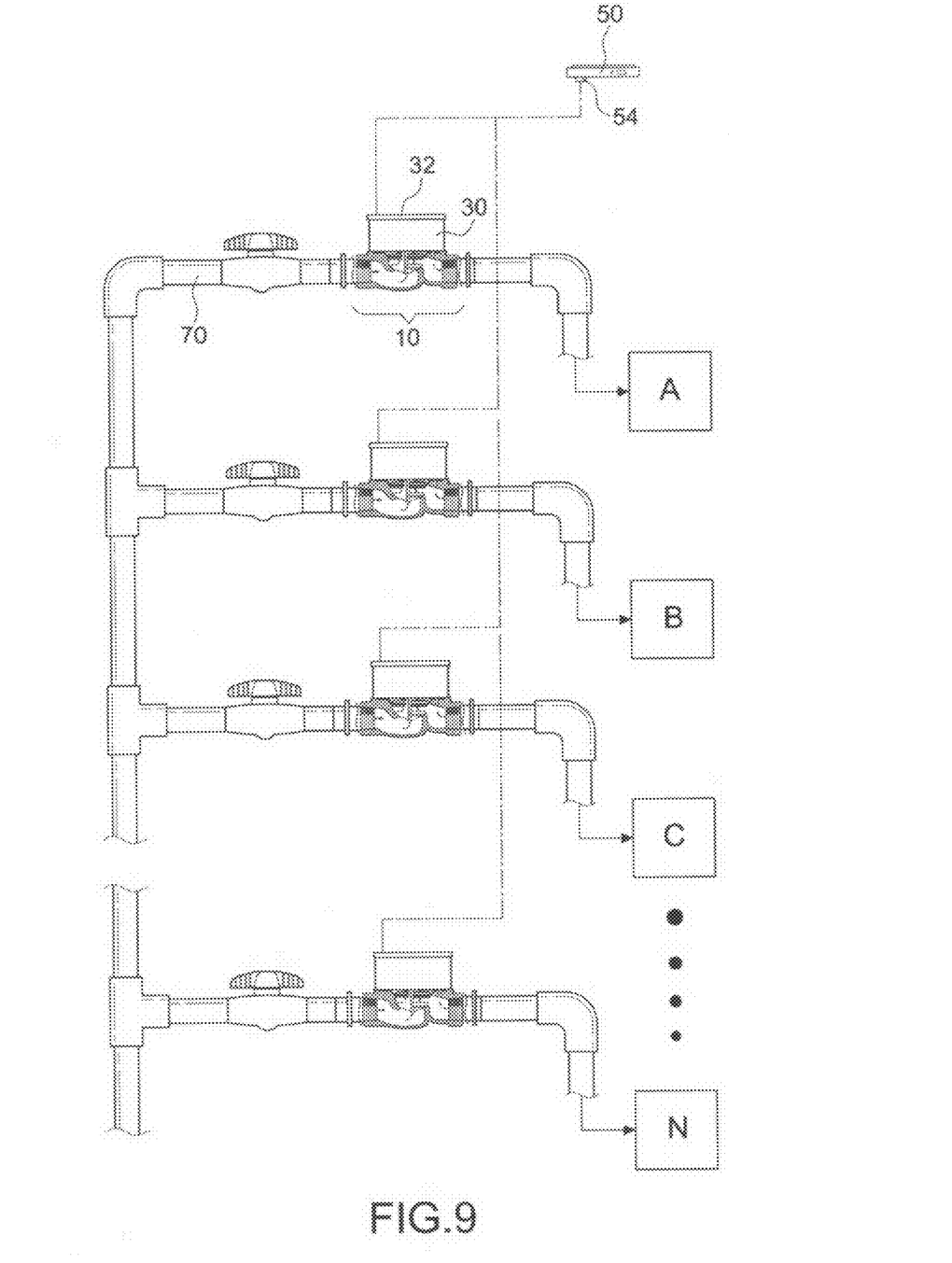
FIG. 9 is an application view of the control valve in accordance with the invention.

Based on the above-mentioned structure, as shown in FIG. 9, the on/off state of the control valves 10 at the sprinkling areas A, B, C, . . . , N may be controlled by only one portable control instrument 50. Normally, the protection cover 32 is placed at the top of the mounting body 30. In connecting the portable control instrument 50 to the mounting body 30, the cover 32 is so removed (see FIG. 4A) that the second transmission interface 54 and the first transmission interface 41 of the memory and drive unit 40 are connected to each other. In this way, the memory and drive unit 40 may receive and save the instructions of the portable control instrument 50. Thereafter, the portable control instrument 50 may be removed and then used for the next control valve 10. The driving circuit within the memory and drive unit 40 will be activated to move the shaft stopper 21 of the electromagnetic solenoid 20 upward and downward when the preset time is up, thereby enabling the sprinkling waterflow in a passing-through state or in a blocked state.

In summary, several sprinkling control valves may be controlled by only one control instrument such that an automatic activation takes place at a preset time. Thus, a convenient installation is achieved. Meanwhile, the cost and the energy may be reduced. Moreover, it is not necessary to fix the control instrument on the sprinkling control valve. As a result, it is not easy to damage the control instrument, thereby increasing the service life of the product. Meanwhile, a reliable operation of the product is ensured. In addition, the operation and the setting process may be done by the computer. Thereafter, a mutual data transmission may take place. Accordingly, a convenient use is achieved. Furthermore, all of the sprinkling data may be easily controlled, thereby fulfilling the requirements of accurate control and scientific management.

What is claimed is:

1. A portable one-to-many control device for a sprinkler pipeline, comprising:
   a) a plurality of sprinkling pipes with a control valve fitted to each of the sprinkling pipes for controlling the on/off state of the sprinkling water; and
   b) an electromagnetic solenoid positioned on the control valve, the electromagnetic solenoid having a shaft stopper for opening or closing a bypass passage, thereby raising or lowering a valve body within the control valve as well as enabling the sprinkling waterflow in a passing-through state or in a blocked state,
   wherein a mounting body sits on the top of the control valve, and the mounting body is shaped higher than the electromagnetic solenoid;
   wherein a memory and drive unit is positioned within the mounting body and powered by a battery, and a first transmission interface is provided at the front end of the first transmission interface while the rear end thereof is in electric connection to the electromagnetic solenoid, and the memory and drive unit is employed for saving data and for activating the electromagnetic solenoid at a preset time to raise/lower the shaft stopper;
   wherein a portable control instrument includes a housing corresponding to the mounting body, a display screen positioned on the surface of the housing, an operation interface, and a connection port, and wherein a second transmission interface is disposed at the bottom of the housing, and when the portable control instrument approaches to the mounting body, the second transmission interface can be electrically connected to the first transmission interface of the memory and drive unit, and wherein a microprocessor is positioned within the housing and electrically connected to the operation interface, the connection port, and the second transmission interface, and wherein the housing internally includes a DC power source for supplying the electric power to the display screen and the microprocessor,
   whereby the portable control instrument can be movably and electrically connected to the memory and drive unit of the different control valves; according to the data in the microprocessor and the different requirements of the control valves, the preset instructions can be transmitted and saved in the memory and drive unit for controlling the activation time of the electromagnetic solenoids, respectively; accordingly, many control valves can be set and controlled by only one portable control instrument;

wherein the DC power source of the portable control instrument includes a battery and an accumulator positioned within the housing, and wherein the accumulator has a charging port which is electrically connectable to an external power source for executing the charging process.

2. The portable one-to-many control device for a sprinkler pipeline as recited in claim 1 wherein the connection port of the portable control instrument is electrically connected to a computer for a mutual data transmission.

3. The portable one-to-many control device for a sprinkler pipeline as recited in claim 1 wherein the first and second transmission interfaces conduct a contact type transmission or a wireless transmission.

4. The portable one-to-many control device for a sprinkler pipeline as recited in claim 1 wherein the mounting body includes an opening, and the opening is covered with a detachable protection cover.

5. The portable one-to-many control device for a sprinkler pipeline as recited in claim 1 wherein a covering face is formed on the surface of the mounting body.

6. The portable one-to-many control device for a sprinkler pipeline as recited in claim 5 wherein the covering face includes an opening for the first transmission interface, and the opening can be covered by a small cover.

7. The portable one-to-many control device for a sprinkler pipeline as recited in claim 1 wherein the control valve includes:
   a) a main body having a water inlet at the front end thereof and a water outlet at the rear end thereof, the main body being attached to the sprinkling pipeline, a first chamber and a second chamber being interposed between the water inlet and the water outlet, a through hole being formed above the first chamber of the main body;
   b) a hood body positioned at the top of the main body, a diaphragm sitting in the through hole such that a third chamber is created in the hollow room of the hood body, a bypass passage being disposed at the side of the third chamber and under the electromagnetic solenoid, the water outlet of the bypass passage leading to the second chamber; and
   c) a valve-lifting unit having a cross plate at the central part thereof, the cross plate being secured to the diaphragm, an upright hollow tube being extended through the center thereof, a valve body being attached to the bottom of the cross plate and positioned at the top of the first chamber for controlling the first and second chambers in a separation or communication state, a spring fitting over the upright hollow tube above the cross plate, the bottom of the upright hollow tube having an inflow hole within the first chamber while the top of the upright hollow tube has an outflow hole within the third chamber.

8. A portable one-to-many control device for a sprinkler pipeline, comprising:
   a) a plurality of sprinkling pipes with a control valve fitted to each of the sprinkling pipes for controlling the on/off state of the sprinkling water; and
   b) an electromagnetic solenoid positioned on the control valve, the electromagnetic solenoid having a shaft stopper for opening or closing a bypass passage, thereby raising or lowering a valve body within the control valve as well as enabling the sprinkling waterflow in a passing-through state or in a blocked state,
   wherein a mounting body sits on the top of the control valve, and the mounting body is shaped higher than the electromagnetic solenoid;
   wherein a memory and drive unit is positioned within the mounting body and powered by a battery, and a first transmission interface is provided at the front end of the first transmission interface while the rear end thereof is in electric connection to the electromagnetic solenoid, and the memory and drive unit is employed for saving data and for activating the electromagnetic solenoid at a preset time to raise/lower the shaft stopper;
   wherein a portable control instrument includes a housing corresponding to the mounting body, a display screen positioned on the surface of the housing, an operation interface, and a connection port, and wherein a second transmission interface is disposed at the bottom of the housing, and when the portable control instrument approaches to the mounting body, the second transmission interface can be electrically connected to the first transmission interface of the memory and drive unit, and wherein a microprocessor is positioned within the housing and electrically connected to the operation interface, the connection port, and the second transmission interface, and wherein the housing internally includes a DC power source for supplying the electric power to the display screen and the microprocessor,
   whereby the portable control instrument can be movably and electrically connected to the memory and drive unit of the different control valves; according to the data in the microprocessor and the different requirements of the control valves, the preset instructions can be transmitted and saved in the memory and drive unit for controlling the activation time of the electromagnetic solenoids, respectively; accordingly, many control valves can be set and controlled by only one portable control instrument;
   wherein the DC power source of the portable control instrument includes a battery positioned within the housing; and
   wherein the mounting body includes an opening, and the opening is covered with a detachable protection cover.

9. A portable one-to-many control device for a sprinkler pipeline, comprising:
   a) a plurality of sprinkling pipes with a control valve fitted to each of the sprinkling pipes for controlling the on/off state of the sprinkling water; and
   b) an electromagnetic solenoid positioned on the control valve, the electromagnetic solenoid having a shaft stopper for opening or closing a bypass passage, thereby raising or lowering a valve body within the control valve as well as enabling the sprinkling waterflow in a passing-through state or in a blocked state,
   wherein a mounting body sits on the top of the control valve, and the mounting body is shaped higher than the electromagnetic solenoid;
   wherein a memory and drive unit is positioned within the mounting body and powered by a battery, and a first transmission interface is provided at the front end of the first transmission interface while the rear end thereof is in electric connection to the electromagnetic solenoid, and the memory and drive unit is employed for saving data and for activating the electromagnetic solenoid at a preset time to raise/lower the shaft stopper;
   wherein a portable control instrument includes a housing corresponding to the mounting body, a display screen positioned on the surface of the housing, an operation interface, and a connection port, and wherein a second transmission interface is disposed at the bottom of the housing, and when the portable control instrument approaches to the mounting body, the second transmission interface can be electrically connected to the first transmission interface of the memory and drive unit, and wherein a microprocessor is positioned within the housing and electrically connected to the operation interface, the connection port, and the second transmission interface, and wherein the housing internally includes a DC power source for supplying the electric power to the display screen and the microprocessor, whereby the portable control instrument can be movably and electrically connected to the memory and drive unit of the different control valves; according to the data in the microprocessor and the different requirements of the control valves, the preset instructions can be transmitted and saved in the memory and drive unit for controlling the activation time of the electromagnetic solenoids, respectively; accordingly, many control valves can be set and controlled by only one portable control instrument;

wherein a covering face is formed on the surface of the mounting body.

10. The portable one-to-many control device for a sprinkler pipeline as recited in claim 9 wherein the covering face includes an opening for the first transmission interface, and the opening can be covered by a small cover.

11. A portable one-to-many control device for a sprinkler pipeline, comprising:
   a) a plurality of sprinkling pipes with a control valve fitted to each of the sprinkling pipes for controlling the on/off state of the sprinkling water; and
   b) an electromagnetic solenoid positioned on the control valve, the electromagnetic solenoid having a shaft stopper for opening or closing a bypass passage, thereby raising or lowering a valve body within the control valve as well as enabling the sprinkling waterflow in a passing-through state or in a blocked state,
   wherein a mounting body sits on the top of the control valve, and the mounting body is shaped higher than the electromagnetic solenoid;
   wherein a memory and drive unit is positioned within the mounting body and powered by a battery, and a first transmission interface is provided at the front end of the first transmission interface while the rear end thereof is in electric connection to the electromagnetic solenoid, and the memory and drive unit is employed for saving data and for activating the electromagnetic solenoid at a preset time to raise/lower the shaft stopper;
   wherein a portable control instrument includes a housing corresponding to the mounting body, a display screen positioned on the surface of the housing, an operation interface, and a connection port, and wherein a second transmission interface is disposed at the bottom of the housing, and when the portable control instrument approaches to the mounting body, the second transmission interface can be electrically connected to the first transmission interface of the memory and drive unit, and wherein a microprocessor is positioned within the housing and electrically connected to the operation interface, the connection port, and the second transmission interface, and wherein the housing internally includes a DC power source for supplying the electric power to the display screen and the microprocessor,
   whereby the portable control instrument can be movably and electrically connected to the memory and drive unit of the different control valves; according to the data in the microprocessor and the different requirements of the control valves, the preset instructions can be transmitted and saved in the memory and drive unit for controlling the activation time of the electromagnetic solenoids, respectively; accordingly, many control valves can be set and controlled by only one portable control instrument;
   wherein the control valve includes:
   a) a main body having a water inlet at the front end thereof and a water outlet at the rear end thereof, the main body being attached to the sprinkling pipeline, a first chamber and a second chamber being interposed between the water inlet and the water outlet, a through hole being formed above the first chamber of the main body;
   b) a hood body positioned at the top of the main body, a diaphragm sitting in the through hole such that a third chamber is created in the hollow room of the hood body, a bypass passage being disposed at the side of the third chamber and under the electromagnetic solenoid, the water outlet of the bypass passage leading to the second chamber; and
   c) a valve-lifting unit having a cross plate at the central part thereof, the cross plate being secured to the diaphragm, an upright hollow tube being extended through the center thereof, a valve body being attached to the bottom of the cross plate and positioned at the top of the first chamber for controlling the first and second chambers in a separation or communication state, a spring fitting over the upright hollow tube above the cross plate, the bottom of the upright hollow tube having an inflow hole within the first chamber while the top of the upright hollow tube has an outflow hole within the third chamber.

* * * * *